United States Patent
Gui et al.

(10) Patent No.: US 10,803,604 B1
(45) Date of Patent: Oct. 13, 2020

(54) LAYERED MOTION REPRESENTATION AND EXTRACTION IN MONOCULAR STILL CAMERA VIDEOS

(71) Applicant: Everseen Limited, Blackpool, Cork (IE)

(72) Inventors: Vasile Gui, Timis (RO); Dan Pescaru, Timisoara (RO); Cosmin Cernazanu-glavan, Timisoara Timis (RO)

(73) Assignee: Everseen Limited, Blackpool, Cork (IE)

( * ) Notice: Subject to any disclaimer, the term of this patent is extended or adjusted under 35 U.S.C. 154(b) by 0 days.

(21) Appl. No.: 16/458,291

(22) Filed: Jul. 1, 2019

(51) Int. Cl.
*G06T 7/246* (2017.01)
*G06K 9/00* (2006.01)
*H04N 7/18* (2006.01)
*H04N 5/14* (2006.01)

(52) U.S. Cl.
CPC .......... *G06T 7/248* (2017.01); *G06K 9/00765* (2013.01); *G06K 9/00771* (2013.01); *H04N 5/145* (2013.01); *H04N 7/18* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

2019/0045193 A1* 2/2019 Socek .................... G06T 7/215

OTHER PUBLICATIONS

Ngo et al, "Motion Analysis and Segmentation Through Spatio-Temporal Slices Processing," IEEE Transactions on Image Processing, vol. 12, No. 3, Mar. 2003 (Year: 2003).*
Irene Y H Gu et al: "Video Segmentation Using Joint Space-Time-Range Adaptive Mean Shift", Jan. 1, 2006 (Jan. 1, 2006), Advances in Multimedia Information Processing—PCM 2006 Lecture Notes in Computer Science;;LNCS, Springer, Berlin, DE, pp. 740-748, XP019047761, ISBN: 378-3-540-48766-1.

(Continued)

*Primary Examiner* — Christopher Braniff
(74) *Attorney, Agent, or Firm* — Young Basile Hanlon & MacFarlane, P.C.

(57) ABSTRACT

A method for segmenting motion data and inferring layering order in a video includes segmenting a first image frame of the video using intra-frame mode estimation, segmenting further image frames of the video using inter-frame mode matching, generating a label change map for a current segmented image frame by generating a binary map of the current segmented image frame, and then marking one or more pixels whose labels have changed with respect to a previous segmented image frame, detecting one or more non-still image segments of the current segmented image frame, detecting one or more moving image segments in the one or more non-still image segments, estimating motion of the one or more moving image segments, representing each moving segment as a vector of seven parameters, and clustering one or more similar moving segment vectors based on corresponding one or more parameters.

17 Claims, 7 Drawing Sheets

(56) References Cited

OTHER PUBLICATIONS

Tiesheng Wang et al: 11 Moving Object Tracking from Videos Based on Enhanced Space-Time-Range Mean Shift and Motion Consistency 11 Multimedia and Expo, 2007 IEEE International Conference on, IEEE, PI, Jul. 1, 2007 (Jul. 1, 2007), pp. 2002-2005, XP031124047, ISBN: 978-1-4244-1016-3.
Fei W et al: 11 Mean shift clustering-based moving object segmentation in the H.264 compressed domain, IET Image Processing, vol. 4, No. I, Feb. 4, 2010 (Feb. 4, 2010), pp. 11-18, XP006034537, ISSN: 1751-9667, DOI: 10.1049/IET-IPR:20090038.
Altunbasak Y et al: "Region-Based Parametric Motion Segmentation Using Color Information", CVGIP Graphical Models and Image Processing, Academic Press, Duluth, MA, US, vol. 60, No. I, Jan. 1, 1998 (Jan. 1, 1998), pp. 13-23, XP004418907, ISSN: 1077-3169, DOI: 10.1006/GMIP.1997.0453.
Dementhon D: "Spatio-temporal segmentation of video by hierarchical mean shift analysis", Proceedings of the Statistical Methods in Video Processing Workshop, Jan. 1, 2002 (Jan. 1, 2002), pp. 115-120, XP002323406.
Salembier P et al: "Region-Based Video Coding Using Mathematical Morphology", Proceedings of the IEEE, IEEE. New York, US, vol. 83, No. 6, Jun. 1, 1995 (Jun. 1, 1995), pp. 843-857, XP000518739, ISSN: 0018-9219, DOI: 10.1109/5.387088.
International search report issued in corresponding international application No. PCT/IB2020/054687 dated Aug. 10, 2020.

\* cited by examiner

LAYERED MOTION REPRESENTATION AND EXTRACTION IN MONOCULAR STILL CAMERA VIDEOS

TECHNICAL FIELD

The present disclosure relates to motion detection in images, and more specifically to segmenting motion and inferring layering order in video sequences captured with monocular still cameras.

BACKGROUND

Moving object detection is a technique used in computer vision and image processing. Multiple consecutive frames from a video are compared by various methods to determine if any moving object is detected. Moving objects detection has been used for wide range of applications like video surveillance, human activity analysis, road condition monitoring, airport safety, and monitoring of protection along marine border. In object detection systems, sometimes the objects are not predefined. After having the object segmentation, measuring the motion of objects is also useful in video scene understanding.

In an image frame, layering order defines what is on top of what. It is a model defining the depth order of (3D) objects. In an example, in a typical painting, the first layer is of a sky, which is the most distant layer. A next layer may contain a building and an airplane. A further next layer may be a car in front of the building etc. The car layer may partially hide the building. In front of the car may be a person, hiding a part of the car. The person is the last layer, as nothing covers the person, and the person thus remains non-occluded. A typical motion detection system requires knowledge of local depth order in order to perform motion detection, and perform action recognition.

However, known state of the art motion estimation and segmentation methods, are computationally expensive, as they use expensive optical flow features, dynamic cameras, and treat all pixels equally. Existing methods may be implemented using Graphic processing units (GPUs) that are electronic circuits specialized for parallel image processing and machine learning, and are computationally expensive. If monocular still cameras are used for capturing frames, the computational complexity may be reduced, but the accuracy of motion detection may be compromised.

In view of the above, there is a need for an object detection system that is computationally less expensive, and is able to accurately segment motion and infer layering order in video sequences captured with monocular still cameras.

SUMMARY

In accordance with an embodiment of the present disclosure, there is provided a method for segmenting motion data and inferring layering order in a video. The method may include segmenting a first image frame of the video using intra-frame mode estimation, and segmenting one or more further image frames of the video using inter-frame mode matching. The method may further include generating a label change map for a current segmented image frame by generating a binary map of the current segmented image frame, and then marking one or more pixels whose labels have changed with respect to a previous segmented image frame. The method may further include detecting one or more non-still image segments of the current segmented image frame based on the label change map, and detecting one or more moving image segments in the one or more non-still image segments. The method may further include estimating motion of the one or more moving image segments, representing each moving segment as a vector of seven parameters, and clustering one or more similar moving segment vectors based on corresponding one or more parameters.

In accordance with another embodiment of the present disclosure, there is provided a system for segmenting motion data and inferring layering order in a video. The system includes a memory to store one or more instructions, and a processor communicatively coupled to the memory. The processor may include a video segmentation module for segmenting a first image frame of the video using intra-frame mode estimation, and segmenting one or more further image frames of the video using inter-frame mode matching. The system may further include a label frame difference generation module for generating a label change map for a current segmented image frame by generating a binary map of the current segmented image frame, and then marking one or more pixels whose labels have changed with respect to a previous segmented image frame. The system may further include a non-still segment detection module for detecting one or more non-still image segments of the current segmented image frame based on the label change map. The system may further include a moving segment detection module for detecting one or more moving image segments in the one or more non-still image segments. The system may further include a motion estimation module for estimating motion of the one or more moving image segments, and a motion segmentation module for representing each moving segment as a vector of seven parameters, and clustering one or more similar moving segment vectors based on corresponding one or more parameters.

In accordance with yet another embodiment of the present disclosure, there is provided a computer programmable product for segmenting motion data and inferring layering order in a video. The computer programmable product comprises a set of instructions, the set of instructions when executed by a processor causes the processor to segment a first image frame of the video using intra-frame mode estimation, segment one or more further image frames of the video using inter-frame mode matching, generate a label change map for a current segmented image frame by generating a binary map of the current segmented image frame, and then marking one or more pixels whose labels have changed with respect to a previous segmented image frame, detect one or more non-still image segments of the current segmented image frame based on the label change map, detect one or more moving image segments in the one or more non-still image segments, estimate motion of the one or more moving image segments, represent each moving segment as a vector of seven parameters, and cluster one or more similar moving segment vectors based on corresponding one or more parameters.

In accordance with yet another embodiment of the present disclosure, there is provided a monocular still camera surveillance system that includes a monocular still camera for capturing the video, a memory to store one or more instructions, and a processor coupled to the memory and configured to execute the one or more instructions stored in the memory to segment a first image frame of the video using intra-frame mode estimation, segment one or more further image frames of the video using inter-frame mode matching, generate a label change map for a current segmented image frame by generating a binary map of the current segmented image frame, and then marking one or more pixels whose labels have changed with respect to a previous segmented image frame, detect one or more non-still image segments of the current segmented image frame based on the label change map, detect one or more moving image segments in the one or more non-still image segments, estimate motion of the one or more moving image segments, represent each moving segment as a vector of seven parameters, cluster one or more similar moving segment vectors based on corresponding one or more parameters, and perform motion detection and activity recognition based on the one or more clusters.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
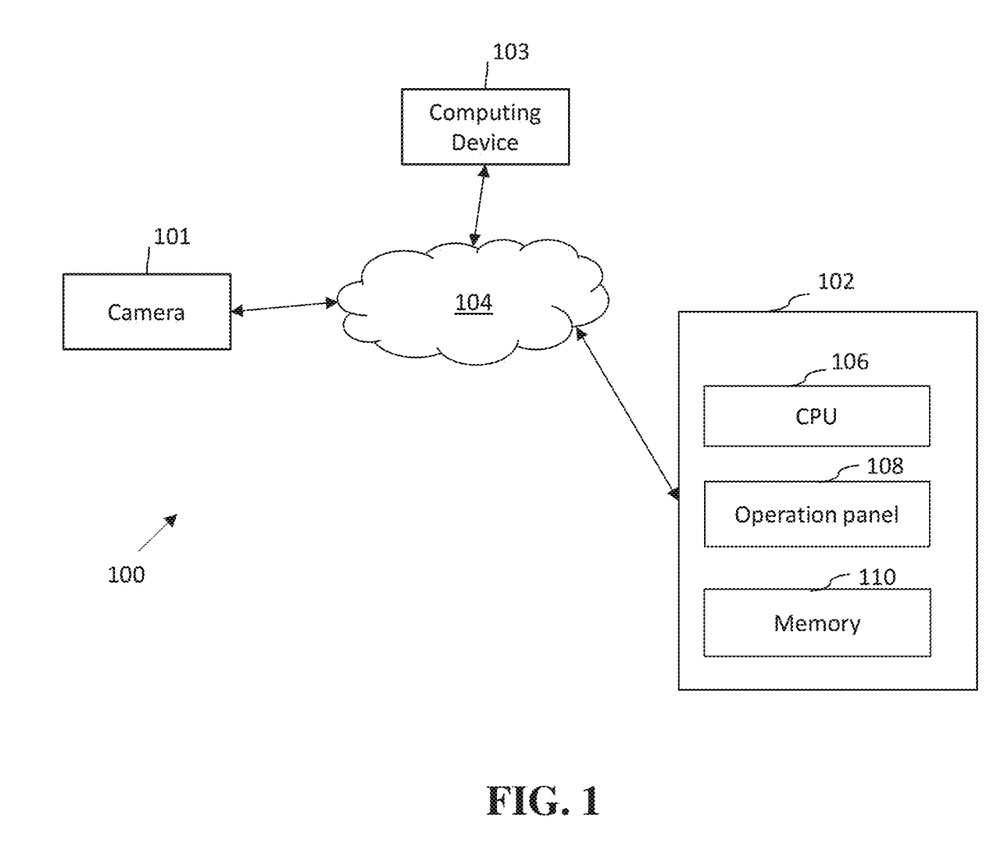
FIG. 1 illustrates an environment, wherein various embodiments of the present disclosure can be practiced.

FIG. 1 illustrates an environment 100, wherein various embodiments of the present disclosure can be practiced. The environment 100 includes a camera 101, a motion detection system 102, and a computing device 103.

The camera 101 is configured to capture and store the video of one or more objects in real-time. Example of the camera 101 include, but is not limited to a monocular still camera primarily used for surveillance purpose.

The motion detection system 102 is configured to perform motion detection and segmentation of video sequences captured by the camera 101.

The motion detection system 102 includes a central processing unit (CPU) 106, an operation panel 108, and a memory 110. The CPU 106 is a processor, computer, microcontroller, or other circuitry that controls the operations of various components such as the operation panel 108, and the memory 110. The CPU 106 may execute software, firmware, and/or other instructions, for example, that are stored on a volatile or non-volatile memory, such as the memory 110, or otherwise provided to the CPU 106. The CPU 106 may be connected to the operation panel 108, and the memory 110, through wired or wireless connections, such as one or more system buses, cables, or other interfaces. In an embodiment of the present disclosure, the CPU 106 may include a custom Graphic processing unit (GPU) server software to provide real-time object detection and prediction, for all cameras on a local network.

The operation panel 108 may be a user interface for the image forming apparatus 100 and may take the form of a physical keypad or touchscreen. The operation panel 108 may receive inputs from one or more users relating to selected functions, preferences, and/or authentication, and may provide and/or receive inputs visually and/or audibly.

The memory 110, in addition to storing instructions and/or data for use by the CPU 106 in managing operation of the image forming apparatus 100, may also include user information associated with one or more users of the image forming apparatus 100. For example, the user information may include authentication information (e.g. username/password pairs), user preferences, and other user-specific information. The CPU 106 may access this data to assist in providing control functions (e.g. transmitting and/or receiving one or more control signals) related to operation of the operation panel 108, and the memory 110.

The camera 101 and the motion detection system 102 may be controlled/operated by the computing device 103. Examples of the computing device 103 include a smartphone, a personal computer, a laptop, and the like. The computing device 103 enables the user/operator to view and save the videos captured by the camera 101, and access the videos/images processed by the motion detection system 102 The computing device 103 may execute a mobile application of the motion detection system 102 so as to enable a user to access and process the video stream captured by the camera 101.

The camera 101, the motion detection system 102 and the computing device 103 may be connected to each other, either through a wired connection, or through a wireless communication network 104. The communication network 104 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

In an embodiment, the camera 101, the motion detection system 102, and the computing device 103 may be integrated in a single device, where the single device is a portable smartphone having a built-in camera and a display.

Figure 2:
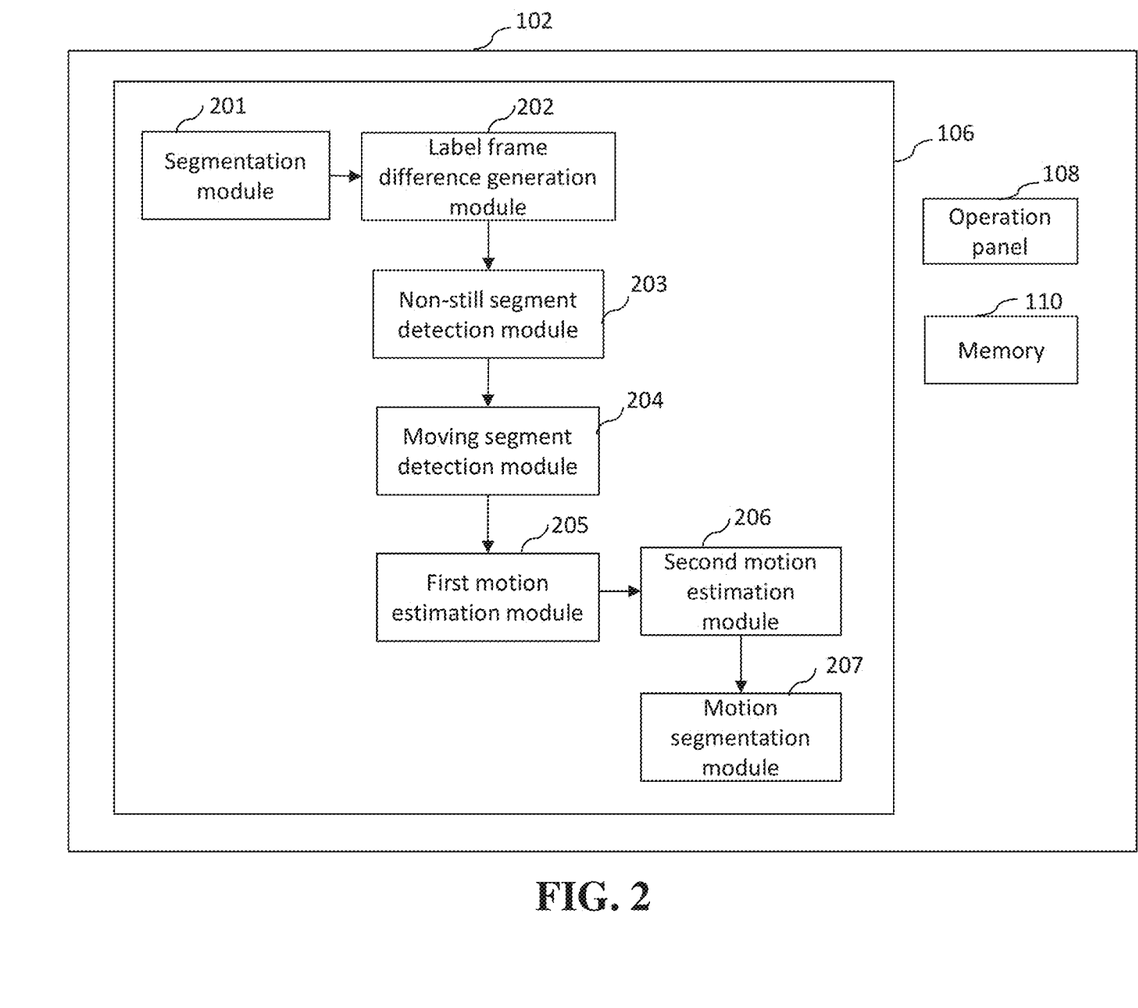
FIG. 2 illustrates a motion detection system for motion detection and segmentation for video sequences captured by camera, in accordance with an embodiment of the present disclosure.

FIG. 2 illustrates the motion detection system 102 for motion detection and segmentation for video sequences captured by camera 101, in accordance with an embodiment of the present disclosure.

The motion detection system 102 includes the CPU 106 that includes a segmentation module 201, a label frame difference generation module 202, a non-still segment detection module 203, a moving segment detection module 204, a first motion estimation module 205, a second motion estimation module 206, and a motion segmentation module 207.

In an embodiment of the present disclosure, each of the seven components 201-207 could exist on a single physical computer, or on more than one computer and communicate through messaging protocols. If the seven components run on a single computer, they could run in separate processes which communicate by communication protocols. If they run within a single process, they might run as threads. A thread is the smallest unit of processing that can be performed in an Operating system. In most modern operating systems, a thread exists within a process, that is, a single process may contain multiple threads. If running in a single process, they could also use a reactive design, enabling the components to share one or more threads. The components 201-207 may be implemented in a programming language.

The segmentation module 201 is configured to perform video segmentation of a video captured by the camera 101 by using joint space-time-range adaptive mean shift. Video segmentation is aimed at segmenting (moving) objects and background along the temporal direction. The motion areas in images are associated with the movement of some foreground/background object/regions, for example, foreground persons, background trees, or roads. In an embodiment of the present disclosure, the mean-shift based video segmentation is performed based on video segmentation, in that segmentation of moving/static objects/background is obtained through inter-frame mode-matching in consecutive frames and motion vector mode estimation. Video segmentation through mode matching is based on the idea that the mode of a pixel(s) in the current frame should be coincident with the mode of a subset of data (or region) representing the same object or region.

The newly appearing objects/regions in the current frame due to new foreground objects or uncovered background regions are segmented by intra-frame mode estimation. For fast processing, the segmentation module 201 uses a rectangular 6 dimensional radially symmetric kernel (a hypersphere of radius h in the X, Y, T, R, G, B spatiotemporal multichannel space) to perform mean-shift based video segmentation. The data space is supposed to be properly normalized, to account for different physical significance and range of the variables.

Figure 3A:
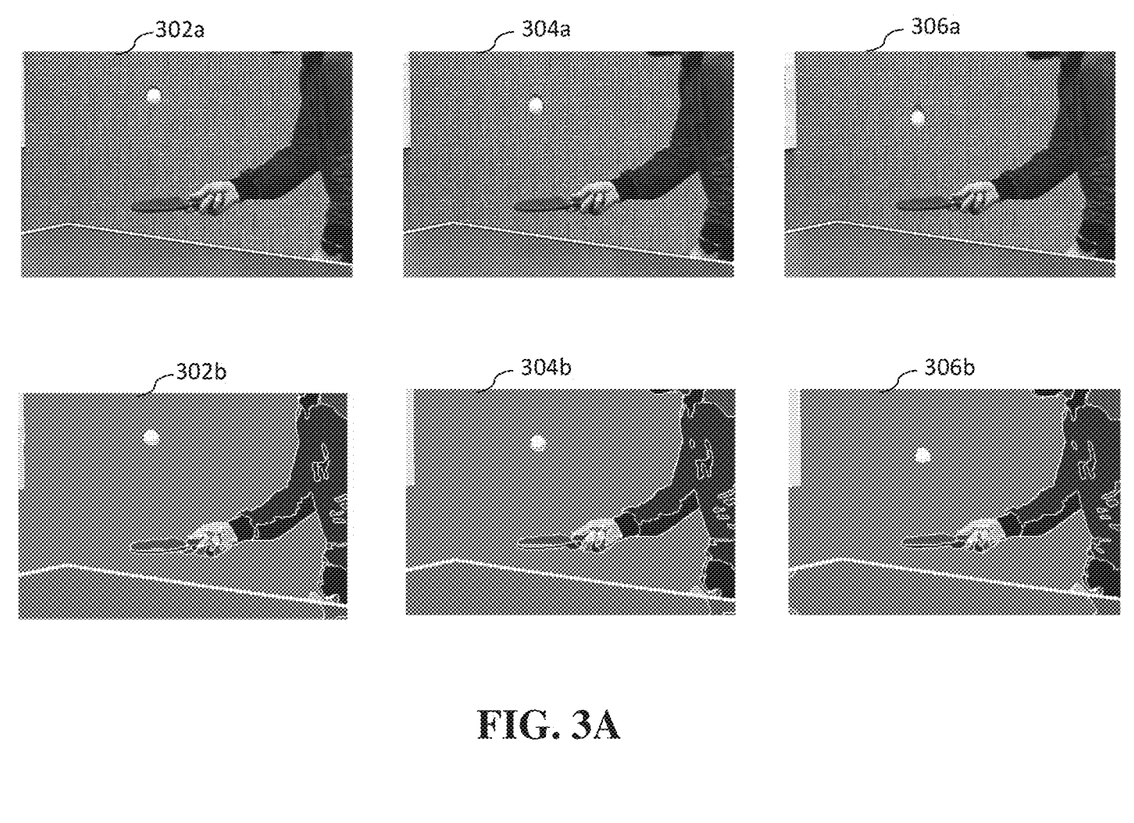
FIGS. 3A and 3B illustrate first through sixth consecutive video frames and their corresponding mean-shift segmented images, in accordance with an embodiment of the present disclosure.
Figure 3B:
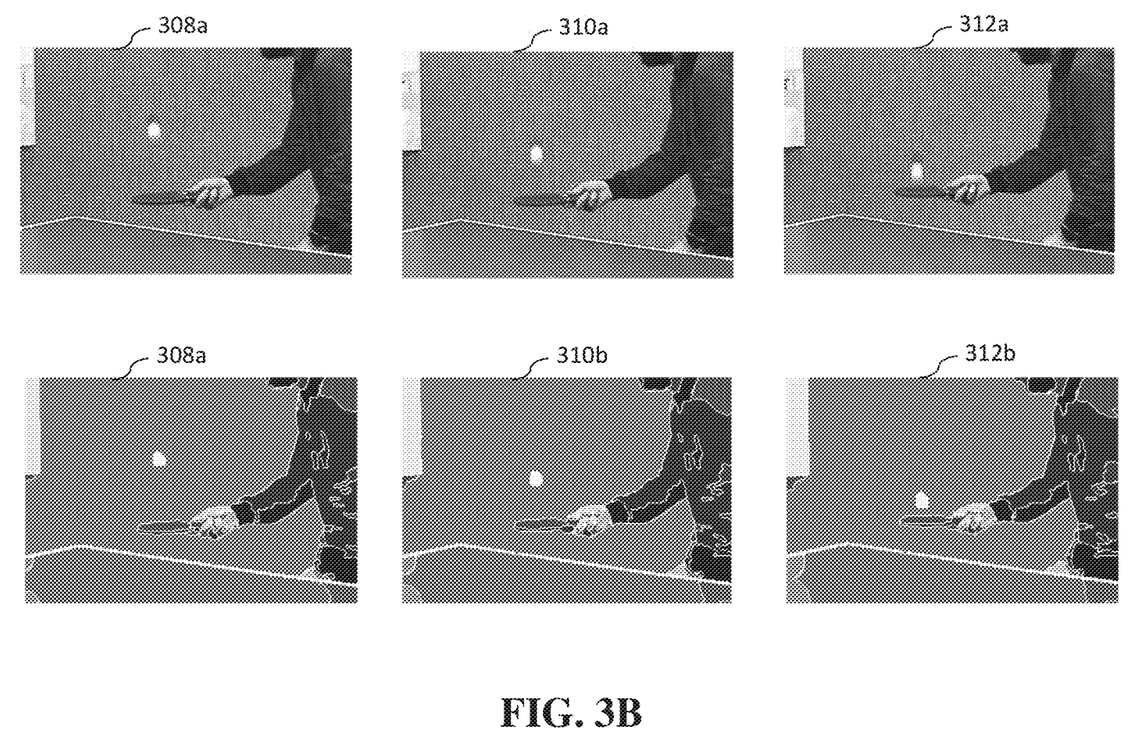

FIGS. 3A and 3B illustrate first through sixth consecutive video frames 302a till 312a and their corresponding mean-shift segmented images 302b till 312b. Each segment in a segmented image is encoded by the color of the mean-shift convergence mode color (kind of weighted average) and the segment borders are highlighted.

In an embodiment of the present disclosure, the first frame 302a of the sequence is segmented by intra-frame mode estimation. The intra-frame mode estimation is mainly designed to handle the new regions that are introduced in a current frame, that is new foreground objects or uncovering previously occluded background. Each pixel in corresponding segmented image 302b is represented by its convergence mode. Pixels converging to the same mode are linked and assigned the same label, using fast propagation, and a label map is also generated for the first frame 302a.

From the second frame 304a onwards, segmentation is performed using inter-frame mode matching. Inter-frame mode matching is used to find similar modes between the pixel in the current frame, and pixels in the previous frame. This can be used to track the corresponding motion/static regions through image frames. In an embodiment of the present disclosure, each pixel in the second segmented frame 304b is assigned to its mean shift mode searched in the segmented previous frame 302b. This subtle detail of the proposed segmentation algorithm is crucial for the present application, since it leads to a very stable result, with smooth spatiotemporal label tubes. The better stability is because the current frame 304a is segmented by density mode finding in the segmented previous frame 302b.

In an embodiment of the present disclosure, the mean shift segmentation method also includes propagating segmentation labels. A pixel in the current frame 304a is assigned the most frequent label found within a kernel distance in the previously segmented frame 302b. As an even faster version of the algorithm, it is checked if the pixel with the same space coordinates in the previous frame 302b is found within a kernel radius distance in the 6D space and assigned its label when the test is true. When no pixel within a kernel distance is found in the previous frame 302b, the pixel is assigned a new label, unless there is an already labelled pixel in the current frame 304a lying within a kernel radius distance. Hence the region correspondence is solved, new labels are assigned to new regions, generated by uncovered background or objects entering the scene. The motion of corresponding segments is set to zero, except the segments touching the image support borders.

Referring back to FIG. 2, the label frame difference generation module 202 is configured to generate a label change map for each current segmented image frame. In an embodiment of the present disclosure, the label change map is formed by generating a binary map of a current segmented image frame, and then marking pixels which have changed the label from previous segmented image frame. The pixels with labels that have changed from the previous segmented image frame may belong to one of the following categories: occluded or non-occluded parts of old objects or parts of new objects entering the scene.

The non-still segment detection module 203 is configured to detect and discard each still image segment from a current segmented image frame. A still image segment has zero motion and need no further processing, whereas non-still segments need to be further classified as static or moving ones. The motion vector of a still segment is zero, as they correspond to covered or uncovered static objects.

Usually, the images captured with still cameras contain large areas without motion. Therefore, a segment generated in a previous image frame which belongs to an area without motion does not change shape or content in a corresponding current image frame. However, the presence of noise and illumination changes, that are supposed to be low between consecutive frames, may induce minor changes. For example, it may be seen that the actual borders of the segments on the table (see, FIGS. 3A and 3B, first through sixth segmented images 302b till 312b) are artificially created by the mean shift clustering and do not correspond to object borders. Slight shadowing and highlights, as well as the illumination gradient on the table may all contribute to forming the segments on the table. This can be solved by checking gradient on segment borders. However, this may create problem in segmenting objects with diffuse edges (like clouds) or objects with low contrast with respect to their background.

In an embodiment of the present disclosure, the non-still segment detection module 203 detects and discards each still image segment of a current image frame, by checking against a threshold, the cardinality of the intersection over union set, computed from a segment and its correspondent in the previous frame.

Figure 4:
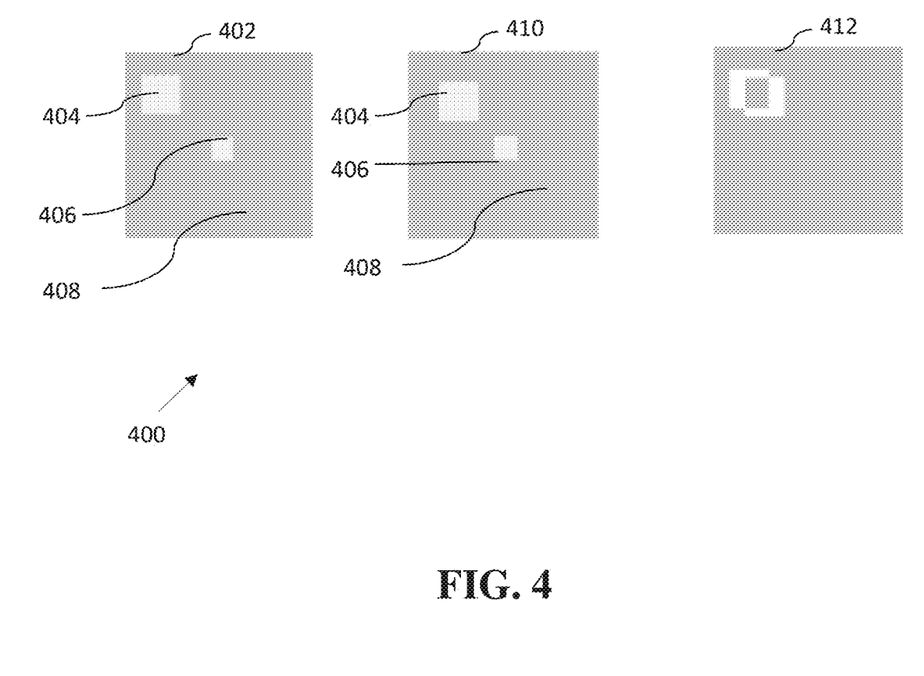
FIG. 4 illustrates an exemplary video sequence depicting still and non-still image segments, in accordance with an embodiment of the present disclosure.

FIG. 4 illustrates an exemplary video sequence 400 depicting still and non-still image segments, in accordance with an embodiment of the present disclosure.

The exemplary video sequence 400 includes a first segmented image frame 402 that includes three segments, i.e. first and second square segments 404 and 406 on a black background segment 408. The second segmented image frame 410 is a next segmented image frame of the video sequence 400. In the second segmented image frame 410, the first square segment 404 has moved towards the second square segment 406, while the second square segment 406 is static. The third image 412 highlights white pixels that have changed during transition from the first to second segmented image frames 402 and 404. Thus, the second square segment 406 may be detected as a still segment and discarded therefrom.

Referring back to FIG. 2, the moving segment detection module 204 is configured to identify static and moving non-still segments in a current segmented image frame. The moving segment detection module 204 first identifies segments that do not change shape, i.e. they do not change cardinality. Such segments represent top local layers and their motion can be estimated accurately by robust regression, with an affine model. The remaining segments may be either static or dynamic. Static segments change shape when they are covered or uncovered by segments belonging to objects moving over in a higher layer. Dynamic segments may change their shape for various reasons, such as being occluded by another moving segment or because of perspective change. The static segments have a significant percentage of their border pixels fixed. The moving non-still segments may be of two types, non-occluded moving segments, and occluded moving segments.

Figure 5A:
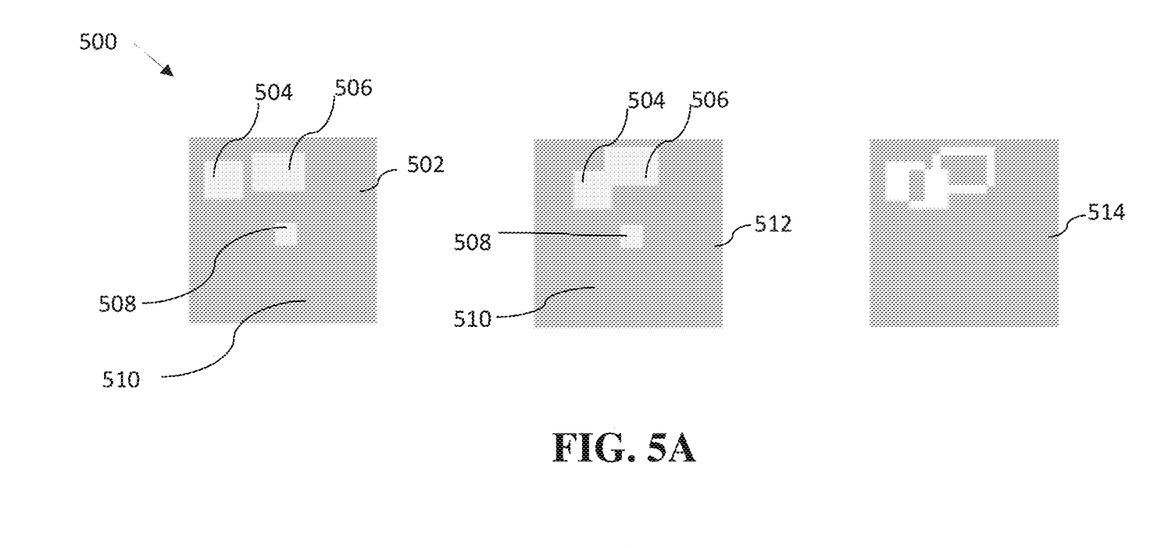
FIG. 5A illustrates an exemplary video sequence depicting various types of non-still image segments, in accordance with an embodiment of the present disclosure.

FIG. 5A illustrates an exemplary video sequence 500 depicting various types of non-still image segments, in accordance with an embodiment of the present disclosure.

The video sequence 500 includes a first image frame 502 that includes four segments, i.e. first, second and third square segments 504, 506 and 508, and a black coloured background segment 510. The black coloured background segment 510 is static and occluded by all other three segments 504, 506 and 508.

As seen in the second image frame 512, the first square segment 504 moves one pixel down and three pixels to the right and is not occluded. As the first square segment 504 moves, it partly occludes the second square segment 506. The second square segment 506 also moves one pixel up and one pixel to the right, but it gets occluded by the first square segment 504. The third square segment 508 is static and is not occluded.

The third image 514 highlights pixels that have changed during transition from the first frame 502 to the second frame 512.

Figure 5B:
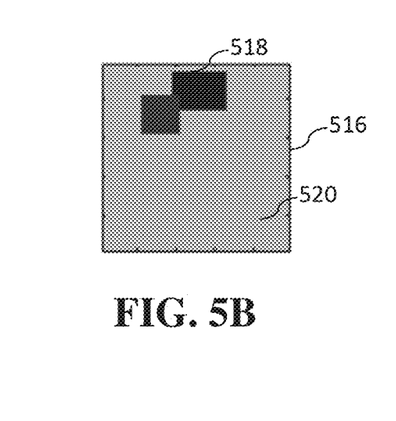
FIG. 5B illustrates a trinary segmentation map generated by the moving segment detection module for the video sequence, in accordance with an embodiment of the present disclosure.

FIG. 5B illustrates a trinary segmentation map 516 generated by the moving segment detection module 204 for the video sequence 500, in accordance with an embodiment of the present disclosure. The trinary segmentation map 516 includes moving non-still segment 518 and static non-still segment 520. The third square segment 508 is static and is therefore a part of the static non-still segment 520. The static non-still segment 520 has zero motion and does not need further processing. The moving segment 518 may be formed of non-occluded moving segments and occluded moving segments.

Referring back to FIG. 2, the first motion estimation module 205 is configured to estimate motion of a non-occluded moving segment such as the first square segment 504 (see, second image frame 512 of FIG. 5A). The first square segment 504 has preserved its size and shape, so it is not occluded, and its position in the first and second image frames 502 and 512 is known. In an embodiment of the present disclosure, the motion of the first square segment 504 can be accurately represented by a general motion model such as a 2D affine model. The model parameters can be estimated via a robust registration method.

Referring back to FIG. 2, the second motion estimation module 206 is configured to estimate motion of an occluded moving segment such as the second square segment 506 (see, second image frame 512 of FIG. 5A). A drop of motion estimation accuracy may be expected for the occluded moving segment. If there is only one occluding segment and the occluding segment is not occluded itself, the motion of the occluded segment may be solved by estimating the motion, if its border pixels are not shared with the occluding segment. As most segments are small, this assumption can be accepted as true. Again, to estimate the motion of the selected border pixels, robust regression with the affine model is the tool that is used, since it can tolerate a large amount of outlier data. The robust regression is a form of regression analysis designed to overcome some limitations of traditional parametric and non-parametric methods, where the regression analysis seeks to find the relationship between one or more independent variables and a dependent variable.

The affine model may be defined as:

$$x' = xs \cos \alpha - y \sin \alpha + t_x,$$

$$y' = x \sin \alpha + ys \cos \alpha + t_y.$$

It is defined by four parameters: $s$, $\alpha$, $t_x$ and $t_y$. These parameters are to be estimated from pairs of segments in adjacent frames using robust registration.

Referring back to FIG. 2, the motion segmentation module 207 is configured to first represent each segment as a vector of seven parameters. In an embodiment of the present disclosure, the seven parameters include two spatial coordinates of a centroid of corresponding segment, four affine parameters including the translation and rotation parameter corresponding to a similarity transform, and a weight of the segment, define by its total number of pixels. In an example, a typical segment vector v is of the form $v = [s, \alpha, t_x, t_y, x_c, y_c]$ and weight $n_p$, where $s$, $\alpha$, $t_x$, and $t_y$ are four affine parameters, and $x_c$ and $y_c$ are spatial co-ordinates of a centroid of corresponding segment.

Once the segment vectors for each segment are determined, the motion segmentation module 207 is configured to form one or more clusters of one or more segment vectors based on corresponding first through sixth parameters. Clustering is a method to group similar entities. For two vectors, similarity may be a distance function. The similarity measure needed in clustering uses the first six parameters of the segment vector except the segment weight. It acts like replicating the vector of any segment times the number of its pixels (its cardinality). In an example, if only two segments have been grouped in a cluster, the cluster center may be updated as the weighted average of the segment vectors: $v_c = (n_{p1} * v_1 + n_{p2} * v_2)/(n_{p1} + n_{p2})$, where $n_{p1}$ and $n_{p2}$ are the individual weights of two segments.

The clustering process facilitates grouping of segments to find moving objects or parts of an articulated object such as human body with similar movement (like a leg, a forearm or the head). It is assumed that all segments of a moving object have similar (not identical) motion. Similarity defines the granularity of representation. A person may walk at an average speed of 5 km/h, but legs and arms may move independently. In an activity recognition application, the motion of each limb has to be characterized.

In an embodiment of the present disclosure, parts of an object with different colors or textures may have similar movement between a few frames, even though the objects may be three-dimensional and can rotate about arbitrary axes. To group segments with similar movement, the mean shift clustering in the 6D space-translation-rotation-scale space may be again used. To account for segment size, weighted sums in the algorithm may be computed, as if the centroid of a segment would have been replicated for each of its pixels. The mean shift algorithm does not need the number of clusters to be known in advance, instead, a scale matrix for the density estimation kernel needs to be specified. Each cluster has a distinct motion, and after clustering, the motion segmentation module 207 is configured to perform motion segmentation of the image to detect and track motion therein, and perform action recognition.

Embodiments of the present disclosure provide a computationally effective solution for the layered motion segmentation problem, built within a cascaded architecture of multiple processing stages. Each processing stage discards safely from further processing, a part of the image. The initial stages work on more data, but have a low complexity, while later stages tend to have higher complexity, but process less data. For accurate motion estimation, robust estimation methods are used, and the advantage of a still camera scenario is being exploited. Usually, with a still camera, most pixels are static (say typically 75%), and are detected earlier by the label frame difference generation module 202 of the motion detection system 102. Only 25% of the total pixels need further processing by the remaining components 203-207. Of the 25% of the total pixels, some objects are non-occluded ones, and are easy to process. The motion detection system 102 facilitates providing only local depth order information, which is relevant for most human action modelling applications, by employing a video segmentation algorithm, which is both stable and fast.

Figure 6:
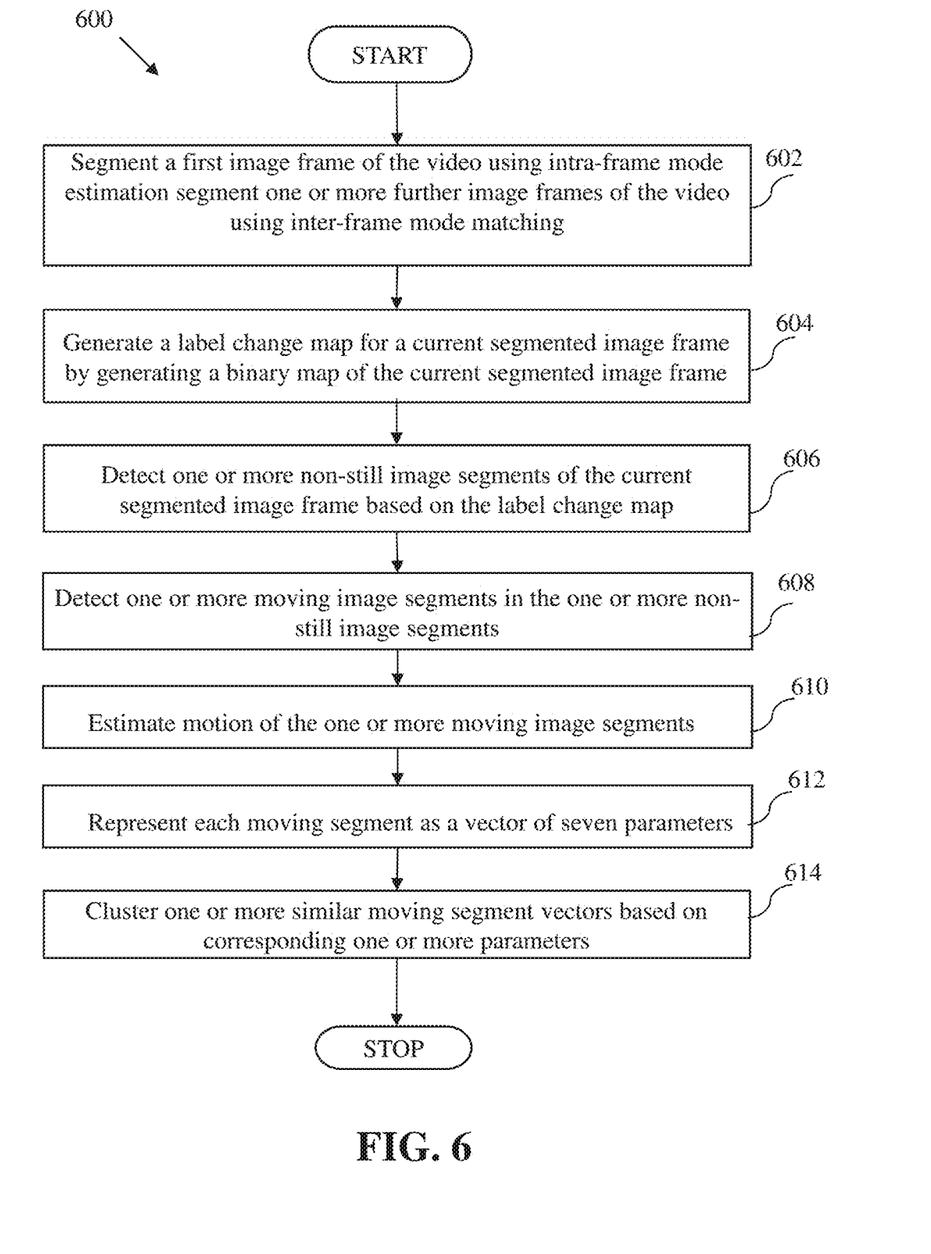
FIG. 6 is a flowchart illustrating a method for motion detection and segmentation for video sequences captured by a camera, in accordance with an embodiment of the present disclosure.

FIG. 6 is a flowchart illustrating a method 600 for motion detection and segmentation for video sequences captured by a camera, in accordance with an embodiment of the present disclosure. Some steps may be discussed with respect to the system as shown in FIG. 2.

At step 602, a first image frame of the video using intra-frame mode estimation is segmented, and one or more further image frames of the video are segmented using inter-frame mode matching. The intra-frame mode estimation is mainly designed to handle the new regions that are introduced in a current frame, that is new foreground objects or uncovering previously occluded background, and inter-frame mode matching is used to find similar modes between the pixel in the current frame, and pixels in the previous frame. In an embodiment of the present disclosure, the video is captured by a monocular still camera. In another embodiment of the present disclosure, one or more image frames of the video are segmented based on a joint space-time-range adaptive mean shift algorithm that uses a hypersphere of radius h in the X, Y, T, R, G, B spatiotemporal multichannel space. Also, segmenting one or more further image frames of the video using inter-frame mode matching includes segmenting a current image frame based on density mode finding in a segmented previous image frame.

At step 604, a label change map is generated for a current segmented image frame by generating a binary map of the current segmented image frame, and then marking one or more pixels whose labels have changed with respect to a previous segmented image frame. The pixels with labels that have changed from the previous segmented image frame may belong to one of the following categories: occluded or dis-occluded parts of old objects or parts of new objects entering the scene.

At step 606, one or more non-still image segments of the current segmented image frame are detected based on the label change map. In an embodiment of the present disclosure, a still image segment has zero motion and need no further processing, whereas non-still segments need to be further classified as static or moving ones. The motion vector of a still segment is zero, as they correspond to covered or uncovered static objects.

At step 608, one or more moving image segments in the one or more non-still image segments are detected. In an embodiment of the present disclosure, the one or more moving segments include one or more non-occluded moving segments and one or more occluded moving segments.

At step 610, motion of the one or more moving image segments is estimated. In an embodiment of the present disclosure, the motion of one or more moving segments is estimated using a two-dimensional affine model. In an embodiment of the present disclosure, the motion of an occluded first square segment can be accurately represented by a general motion model such as a 2D affine model. The model parameters can be estimated via a robust registration method. In another embodiment of the present disclosure, robust regression with the affine model is used to estimate the motion of a non-occluded moving segment.

At step 612, each moving segment is represented as a vector of seven parameters. In an embodiment of the present disclosure, the seven parameters include two spatial coordinates of a centroid of corresponding segment, four affine parameters including translation and rotation parameter corresponding to a similarity transform, and a weight defined by total number of corresponding pixels.

At step 614, one or more similar moving segment vectors are clustered based on corresponding one or more parameters. In an embodiment of the present disclosure, once the segment vectors for each segment are determined, one or more clusters of one or more segment vectors are formed based on corresponding first through sixth parameters. Clustering is a method to group similar entities. For two vectors, similarity may be a distance function. The similarity measure needed in clustering uses the first six parameters of the segment vector except the segment weight. The clustering process facilitates grouping of segments to find moving objects or parts of an articulated object such as human body with similar movement (like a leg, a forearm or the head).

The clustering process facilitates grouping of segments to find moving objects or parts of an articulated object such as human body with similar movement (like a leg, a forearm or the head). It is assumed that all segments of a moving object have similar (not identical) motion. Similarity defines the granularity of representation. A person may walk at an average speed of 5 km/h, but legs and arms may move independently. In an activity recognition application, the motion of each limb has to be characterized.

In an embodiment of the present disclosure, one or more motion recognition results may be transmitted to a user computing device. In some embodiments, the user computing device may be configured to store or display such recognition results.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for segmenting motion data and inferring layering order in a video, the method comprising:
   segmenting a first image frame of the video using intra-frame mode estimation;
   segmenting one or more further image frames of the video using inter-frame mode matching;
   generating a label change map for a current segmented image frame by generating a binary map of the current segmented image frame;
   marking one or more pixels whose labels have changed with respect to a previous segmented image frame;
   detecting one or more non-still image segments of the current segmented image frame based on the label change map;
   detecting one or more moving image segments in the one or more non-still image segments;
   estimating motion of the one or more moving image segments;
   representing each moving segment as a vector of seven parameters, wherein the seven parameters include two spatial coordinates of a centroid of corresponding segment, four affine parameters including translation and rotation parameter corresponding to a similarity transform, and a weight defined by total number of corresponding pixels; and
   clustering one or more similar moving segment vectors based on corresponding one or more parameters.

2. The method of claim 1, wherein the video is captured by a monocular still camera.

3. The method of claim 1, wherein in the one or more moving segments include one or more non-occluded moving segments and one or more occluded moving segments.

4. The method of claim 1, wherein the motion of one or more moving segments is estimated using a two-dimensional affine model.

5. The method of claim 1, wherein one or more image frames of the video are segmented based on a joint space-time-range adaptive mean shift algorithm that uses a hypersphere of radius h in the X, Y, T, R, G, B spatiotemporal multichannel space.

6. The method of claim 1, wherein the segmenting one or more further image frames of the video using inter-frame mode matching comprises segmenting a current image frame based on density mode finding in a segmented previous image frame.

7. A system for segmenting motion data and inferring layering order in a video, the system comprising:
   a memory to store one or more instructions; and
   a processor communicatively coupled to the memory, and configured to execute the one or more instructions stored in the memory, wherein the processor comprises:
   a video segmentation module for segmenting a first image frame of the video using intra-frame mode estimation, and segmenting one or more further image frames of the video using inter-frame mode matching;
   a label frame difference generation module for generating a label change map for a current segmented image frame by generating a binary map of the current segmented image frame, and then marking one or more pixels whose labels have changed with respect to a previous segmented image frame;
   a non-still segment detection module for detecting one or more non-still image segments of the current segmented image frame based on the label change map;
   a moving segment detection module for detecting one or more moving image segments in the one or more non-still image segments;
   a motion estimation module for estimating motion of the one or more moving image segments; and
   a motion segmentation module for representing each moving segment as a vector of seven parameters, and clustering one or more similar moving segment vectors based on corresponding one or more parameters, wherein the seven parameters include two spatial coordinates of a centroid of corresponding segment, four affine parameters including translation and rotation parameter corresponding to a similarity transform, and a weight defined by total number of corresponding pixels.

8. The system of claim 7, wherein the video is captured by a monocular still camera.

9. The system of claim 7, wherein in the one or more moving segments include one or more non-occluded moving segments and one or more occluded moving segments.

10. The system of claim 7, wherein the motion of one or more moving segments is estimated using a two-dimensional affine model.

11. The system of claim 7, wherein one or more image frames of the video are segmented based on a joint space-time-range adaptive mean shift algorithm that uses a hypersphere of radius h in the X, Y, T, R, G, B spatiotemporal multichannel space.

12. The system of claim 7, wherein the segmenting one or more further image frames of the video using inter-frame mode matching comprises segmenting a current image frame based on density mode finding in a segmented previous image frame.

13. A non-transitory computer readable medium configured to store a program causing a computer to segment motion data and inferring layering order in a video, said program configured to:
segment a first image frame of the video using intra-frame mode estimation;
segment one or more further image frames of the video using inter-frame mode matching;
generate a label change map for a current segmented image frame by generating a binary map of the current segmented image frame;
mark one or more pixels whose labels have changed with respect to a previous segmented image frame;
detect one or more non-still image segments of the current segmented image frame based on the label change map;
detect one or more moving image segments in the one or more non-still image segments;
estimate motion of the one or more moving image segments;
represent each moving segment as a vector of seven parameters, wherein the seven parameters include two spatial coordinates of a centroid of corresponding segment, four affine parameters including translation and rotation parameter corresponding to a similarity transform, and a weight defined by total number of corresponding pixels; and
cluster one or more similar moving segment vectors based on corresponding one or more parameters.

14. The non-transitory computer readable medium of claim 13, wherein the video is captured by a monocular still camera.

15. The non-transitory computer readable medium of claim 13, wherein in the one or more moving segments include one or more non-occluded moving segments and one or more occluded moving segments.

16. The non-transitory computer readable medium of claim 13, wherein the motion of one or more moving segments is estimated using a two-dimensional affine model.

17. A monocular still camera surveillance system, comprising:
a monocular still camera for capturing the video;
a memory to store one or more instructions; and
a processor coupled to the memory and configured to execute the one or more instructions stored in the memory to:
segment a first image frame of the video using intra-frame mode estimation;
segment one or more further image frames of the video using inter-frame mode matching;
generate a label change map for a current segmented image frame by generating a binary map of the current segmented image frame, and then marking one or more pixels whose labels have changed with respect to a previous segmented image frame;
detect one or more non-still image segments of the current segmented image frame based on the label change map;
detect one or more moving image segments in the one or more non-still image segments;
estimate motion of the one or more moving image segments;
represent each moving segment as a vector of seven parameters, wherein the seven parameters include two spatial coordinates of a centroid of corresponding segment, four affine parameters including translation and rotation parameter corresponding to a similarity transform, and a weight defined by total number of corresponding pixels;
cluster one or more similar moving segment vectors based on corresponding one or more parameters; and
performing motion detection and activity recognition based on the one or more clusters.

* * * * *